United States Patent
Fuchs et al.

(10) Patent No.: US 9,965,524 B2
(45) Date of Patent: May 8, 2018

(54) SYSTEMS AND METHODS FOR IDENTIFYING ANOMALOUS DATA IN LARGE STRUCTURED DATA SETS AND QUERYING THE DATA SETS

(71) Applicant: salesforce.com, inc., San Francisco, CA (US)

(72) Inventors: Matthew Fuchs, Los Gatos, CA (US); Stanislav Georgiev, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 536 days.

(21) Appl. No.: 14/244,146

(22) Filed: Apr. 3, 2014

(65) Prior Publication Data
US 2014/0304279 A1    Oct. 9, 2014

Related U.S. Application Data

(60) Provisional application No. 61/807,895, filed on Apr. 3, 2013, provisional application No. 61/807,942, filed on Apr. 3, 2013.

(51) Int. Cl.
*G06F 17/30* (2006.01)
*H04B 17/00* (2015.01)

(52) U.S. Cl.
CPC ........ *G06F 17/30539* (2013.01); *H04B 17/00* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Singh, Sarvjeet, et al., "Orion 2.0: Native Support for Uncertain Data," Purdue University, Department of Computer Science, Copyright Jun. 9-12, 2008, 3 pages.

*Primary Examiner* — Syed Hasan
*Assistant Examiner* — Tuan-Khanh Phan
(74) *Attorney, Agent, or Firm* — Morris & Kamlay LLP

(57) ABSTRACT

The technology disclosed relates to automatic generation of tuples from a record set for outlier analysis. Applying this new technology, user need not specify which 1-tuples to combine into n-tuples. The tuples are generated from structured records organized into features (that also could be fields, objects or attributes.) Tuples are generated from combinations of feature values in the records. Thresholding is applied to manage the number of tuples generated. The technology disclosed further relates to indexing and searching high dimensional tuple spaces in a computer-implemented system.

19 Claims, 8 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,798,876 B1 * | 9/2004 | Bala .................. H04M 3/5233 379/265.02 |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0228797 A1 * | 9/2008 | Kenedy .................. G06Q 40/00 |
| 2008/0249972 A1 | 10/2008 | Dillon |
| 2008/0281915 A1 * | 11/2008 | Elad ...................... G06Q 10/10 709/204 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0282039 A1 * | 11/2009 | Diamond .......... G06F 17/30985 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

* cited by examiner

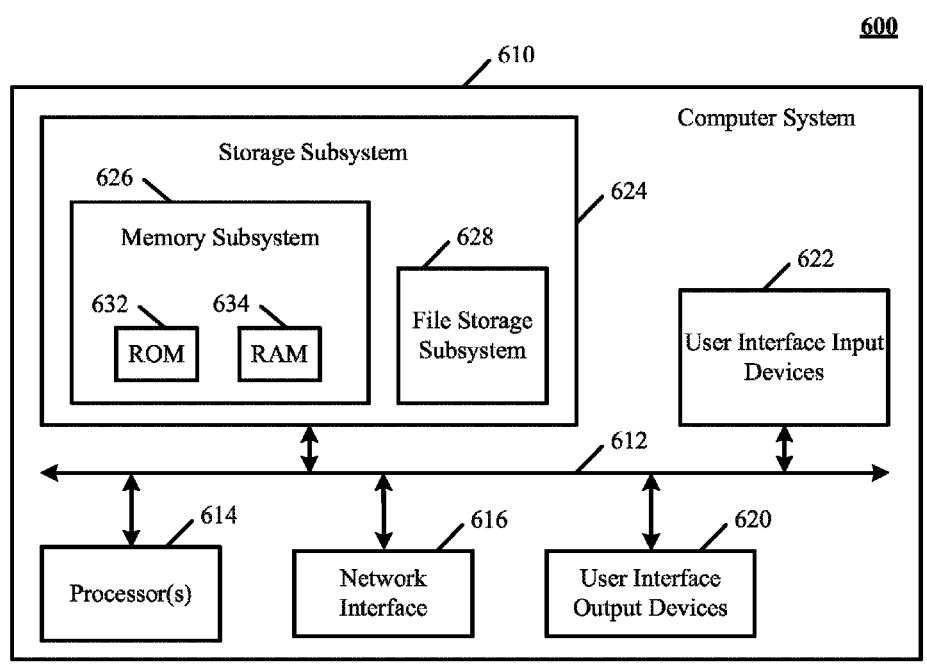
FIG. 6 – Computer System

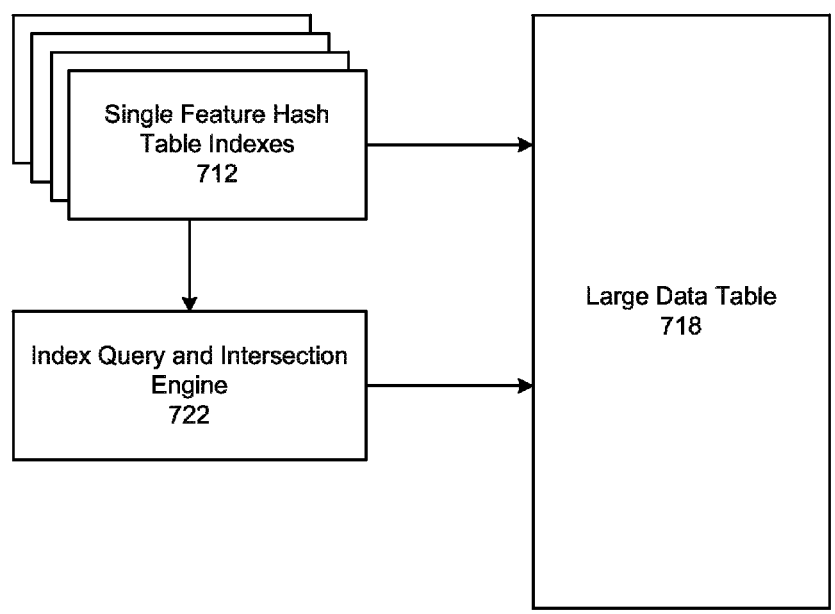
FIG. 7 – Hashed Index

SYSTEMS AND METHODS FOR IDENTIFYING ANOMALOUS DATA IN LARGE STRUCTURED DATA SETS AND QUERYING THE DATA SETS

RELATED APPLICATION

The application claims the benefit of U.S. provisional Patent Application No. 61/807,895, on Apr. 3, 2013 (SALE 1072-1/1153PR). It also claims the benefit of No. 61/807,942, entitled, "System and Method for Indexing and Searching High Dimensional Tuple Spaces," on Apr. 3, 2013 (SALE 1073-1/1160PR). The provisional applications are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to automatic generation of tuples from a record set for outlier analysis. Applying this new technology, users need not specify which 1-tuples to combine into n-tuples. The tuples are generated from structured records or objects organized into features (that also could be properties, fields, objects or attributes.) Tuples are generated from combinations of feature values in the records. Thresholding is applied to manage the number of tuples generated.

Big data systems now analyze large data sets in interesting ways. However, many times systems that implement big data approaches are heavily dependent on the expertise of the engineer who has considered the data set and its expected structure. The larger the number of features of a data set, sometimes called fields or attributes of a record, the more possibilities there are for analyzing combinations of features and feature values.

Accordingly, an opportunity arises to automatically analyze large data sets quickly and effectively. There are many ways in which automatically spotting outliers in data relationships can be used to discover patterns and trends. Patterns and trends sometimes indicate fraud, as in insurance reimbursement claims, and other times indicate commercially valuable trends.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 6 is a block diagram of an example computer system capable of identifying anomalous data.

FIG. 7 is a high-level block diagram of a system that can be applied to indexing and searching high dimensional tuple spaces in a computer-implemented system.

DETAILED DESCRIPTION

Figure 1:
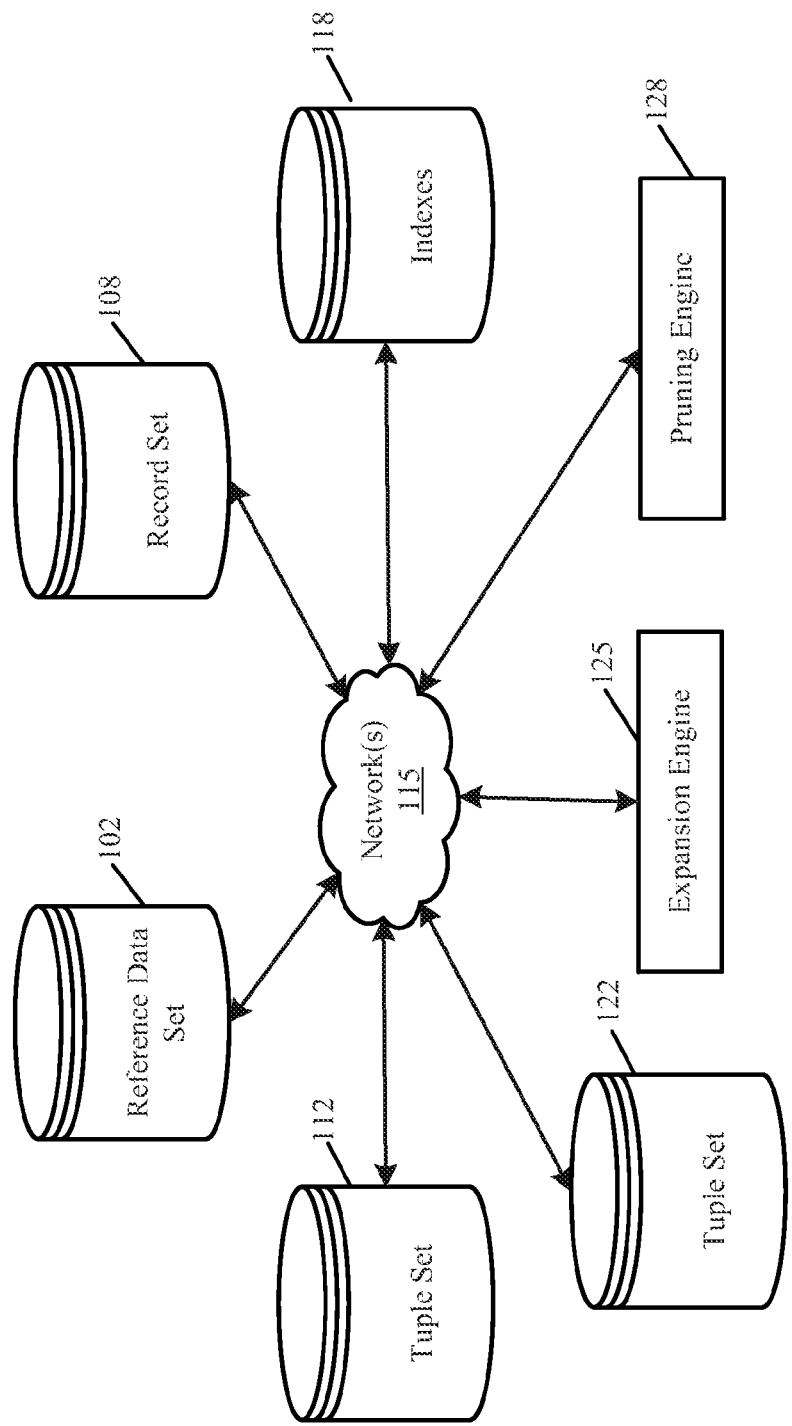
FIG. 1 shows one implementation of an example environment for tuple generation.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods according to the disclosed implementations are described in a "sales contacts" context. The examples of sales contacts such as leads, prospects and accounts are used solely to add context and aid in the understanding of the disclosed implementations. In other instances, data with numerous elements may include insurance claims, customer service call routing, etc. or any data that would have a significant number of features. Other applications are possible, so the following examples should not be taken as definitive or limiting either in scope, context or setting. It will thus be apparent to one skilled in the art that implementations may be practiced in or outside the "sales contacts" context.

The technology disclosed relates to automatic, unsupervised generation of tuples from a record set for outlier analysis. Another aspect of the technology disclosed relates to indexing and querying the data tuples. The tuples are generated from structured records organized into features (that also could be properties, fields, objects or attributes.) Tuples are generated from combinations of unique feature values. Combinatorial generation of feature-combination-tuples generates many tuples that are uninhabited, which are logical possibilities but that actually do not appear in the record set. Some inhabited tuples are sparsely inhabited; they occur too few times for statistical or probabilistic analysis.

Lists of tuples that combine unique feature values are managed by repeatedly applying at least one threshold count criterion. This threshold count criterion is in a range such as 2 to 20 or 4 to 14. We consider applying a threshold of 0 or 1 to be a special case that does not realize some advantages of a small threshold in the range of 2 to 20. Applying a threshold of 0 would enumerate all logically possible combinations, which is potentially a very large number. Applying a threshold of 1 would enumerate all combinations actually present in a data set. Applying threshold count criterion of at least 2 eliminates uninhabited and sparsely inhabited tuples from analysis and reduces the number of generated tuples.

Thresholding candidate tuples during generation improves the practicality of combinatorial generation of feature tuples. Thresholding can be applied when a candidate tuple is identified. If the threshold is not satisfied by a count of records that include the key-value combinations in the candidate tuple, processing is curtailed. For instance, the candidate tuple may not be added to an index. Or, a frequency of the candidate tuple in a record set being tested may not be analyzed against a frequency of the candidate in a reference data set. The candidate tuple that fails thresholding will not be used for further expansion or production of longer tuples. Logically, if a 3-tuple, for instance, fails a threshold criterion, then it is not possible for there to be any 4-tuple expansions of the 3-tuple that pass the threshold criterion, because each such 4-tuple belongs to a proper subset of the 3-tuple set from which the 4-tuple was expanded. Suppose a 3-tuple with the values (x,y,z) and there are not enough (x,y,z) tuple elements to satisfy the threshold criterion. It follows that the 4-tuple (x,y,z,a) has less than or equal to the number of instances of (x,y,z). So, the 4-tuple cannot satisfy the threshold criterion, because the 3-tuple from which it was expanded fails.

Expansion combines a list of 1-tuple values with an m-tuple (m+1=n and m>1, in this example) to produce n-tuples, progressing from shorter tuples to longer tuples. We are assured by progressive expansion that entries in the m-tuple list already satisfy the threshold criterion. Candidate n-tuples are tested to see if they satisfy the threshold criterion. If they do not, processing of the failed candidate m-tuple is curtailed. Alternatively, n-tuples could be generated and lists of the n-tuples pruned using the threshold criterion, to the same effect.

Combinatorial generation of tuples grows at a manageable rate due to application of the threshold criterion. Thresholding takes advantage of the fact that feature combinations such as (first name, last name) and (city, state) are interdependent. For instance, the most common first name is Mohammed and the most common last name is Le, but Mohammed Le is relatively uncommon.

Outlier analysis is one of the additional processes that can follow thresholding during combinatorial generation of tuples. This involves comparing tuples generated from the record set, to feature tuples from a reference data set. Typically, frequencies or proportions are compared to normalize data set sizes, because the record set is smaller (sometimes much smaller) than the reference data set. In some implementations, the reference data set tuples can be generated in the same manner as described for the record set. In other implementations, at least one index to the reference data set contains count or frequency data. The technology disclosed can use counts or frequencies of tuples in the reference data set however they become available.

This generation of feature tuples is unsupervised in the sense that a user need not specify how to combine 1-tuples into n-tuples. For example, without supervision, five features of a record set could be combined to produce 2-tuples, 3-tuples and 4-tuples. The five features also could be combined to produce 5-tuples, which would enumerate the unique tuple values in the five-feature record set. In some instances, minimal guidance can be provided, with a user selecting from a record set having m features, which j features to combine, where j<=m. A user could speed repeated application of an analysis to record sets by eliminating combinations that have proven irrelevant (though for fraud detection, for instance, a full analysis could be superior to analysis of selected tuples.)

Tuple Generation Environment

FIG. 1 shows one implementation of an example tuple generation environment 100 which may include a reference data set 102 such as Salesforce.com's Data.com. FIG. 1 also shows record set 108, network(s) 115, tuple set 122, expansion engine 125 and indexing engine 128.

In some implementations, network(s) 115 can be any one or any combination of Local Area Network (LAN), Wide Area Network (WAN), WiMAX, WiFi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Data, record and tuple sets 102, 108, 122 can store information from one or more tenants into tables of a common database image to form an on-demand database service, which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

The engines 125, 128 can be of varying types including a workstation, server, computing cluster, blade server, server farm, or any other data processing system or computing device. The engines can be communicably coupled to the databases via a different network connection. For example, expansion engine 125 can be coupled via the network 115 (e.g., the Internet) and indexing engine 128 can be connected to a direct network link.

Reference data set 102 is a large data set, such as a contact repository from Dun & Bradstreet or Jigsaw. It can include contact information aggregated and crowd sourced from many different users and sources. By large data set, we mean a data set having over 100,000 elements, objects or records. As a practical matter, a large data set has less than 100 trillion elements, objects or records.

Record set 108 includes structured data, such as contact or account data in some implementations. In one implementation, contact or account data can be organized into record features (that also could be fields, objects or attributes). Examples of record features can include first name, last name, company, title, job function, city and state. Other examples of features are data generated from record properties. For example, one feature could be whether the email address in a contact reflects user's name—e.g., jdoe@foo.com is reasonable from john doe, but blork@foo.com is not.

Tuple set 122 includes tuples generated from combinations of feature values in the record set 108. For instance, tuple set 108 can include a triple or 3-tuple with three record features that store a person's first name as the first feature, last name as the second feature, and the person's job title as the third feature. In other implementations, tuple set 108 can include a singleton or 1-tuple, pair or 2-tuple, or other n-tuples. The tuple set can include both existing tuples and expanded tuples, as those tuple sets are described as part of the technology disclosed.

Expansion engine 106 automatically expands a record in an existing tuple set by adding a new feature to the existing tuple set. It adds to unique tuples in the existing tuple set one more feature of a 1-tuple set. Unique values of features in the 1-tuple set can be combined with an existing m-tuple when the resulting n-tuple satisfies a threshold criterion. Typically, the threshold criterion is not applied to 1-tuples, because 1-tuples can be accompanied by frequency counts, which reduces any potential benefit of discarding unique values that could be useful in some processing step or another. If there is no optimization that benefits from retaining unique values in a 1-tuple list, then unique values that fail the thresholding criterion could be removed. In some alternative implementations, m- or n-tuples could be generated by unqualified expansion, followed by applying the threshold count criterion to prune the generated n-tuples list.

Again, the expansion engine 125 applies the threshold count criterion. In other implementations, tuples can be created first and then subjected to the threshold count criterion. The result of combinatorial generation of a tuple set can be managed by applying the threshold count criterion early and often.

In many practical applications, batches of new n-tuples are added to an existing database of n-tuples. For instance, new crowd-sourced contributions of contacts are continuously contributed to an existing contact database. Multiple sources of contact contributions can be processed overnight. Acceptance process can involve screening for anomalies.

Combinatorial Tuple Generation

Figure 2:
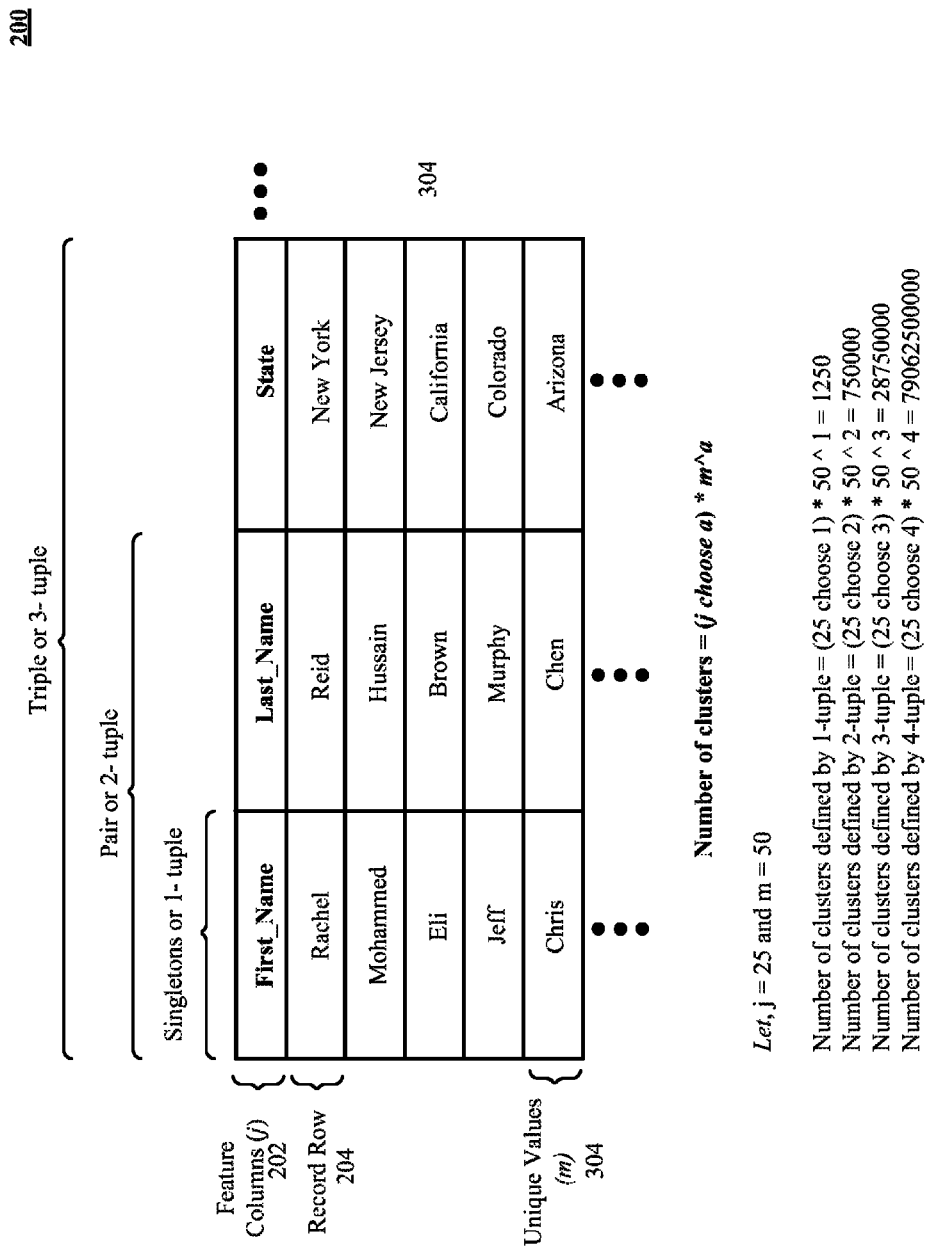
FIG. 2 is a representation of potential tuples generated without the use of thresholding.

FIG. 2 is a representation of potential tuples generated 200 without the use of thresholding (which is the same as a threshold of 0.) In this embodiment, the number of clusters=(j choose a)*m^a, where "m" is unique values 206 and represents the number of fact record entries. Each complete fact record row 204, contains fact data for each property. For example "Rachel Reid New York" is a complete fact record 204 because "First_Name", "Last_Name", and "State" each have a value in the completed fact record 204. The "j" feature columns 202 indicate properties that, in this example, include "First_Name", "Last_Name", and "State". and "a" indicates a tuple or list of or list of ordered elements. A singleton or 1-tuple is where a=1. A pair or 2-tuple is where a=2. A triple or 3-tuple is where a=3. As the number a of tuple features increases, the number of clusters for the total tuple space becomes very large. For example, where j=25 and m=50, as we apply our cluster formula from earlier [(j choose a)*m^a], to single tuples, then (25 choose 1)*50^1=1250 potential values. By the same formula, the number of clusters for 2-tuples yields 750000 potential combinations, for 3-tuples 2875000 combinations and for 4-tuple 79062500000. Thus, the number of potential clusters quickly becomes very large.

While the number of potential clusters is large, the number of clusters actually inhabited by facts is far less. If the properties of the facts are independent, then there can be an exponential drop off in the number of inhabitants. Assuming there are k facts, each defined by j tuples, and each type has an arity m, the number of clusters defined by a tuples can be (j choose a)*m^a=m^j–a large number. However the likely number of inhabitants can only be (k/(m^a)) for each of them, with exponentially decreasing population of inhabitants per cluster as "a" increases. Since the clusters with "unexpectedly" large populations are more significant for analysis, the technology disclosed can put a lower limit on the number of inhabitants, a threshold, and ignore smaller clusters. A low threshold count criterion can effectively provide us with a moderate number of inhabited tuples when we prune our data.

Data Thresholding

Figure 3A:
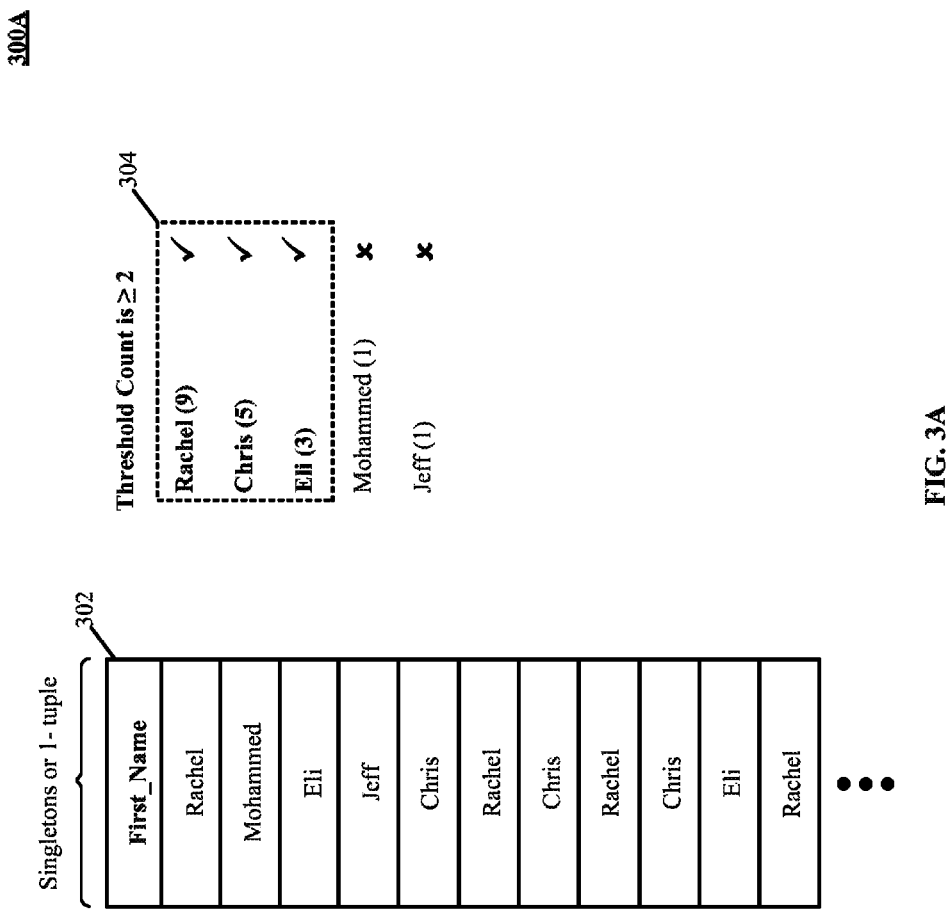
FIG. 3A illustrates data thresholding applied dynamically to a singleton or 1-tuple data set.

FIG. 3A illustrates data thresholding applied dynamically to a singleton or 1-tuple data set, where a threshold count criterion of two is applied to a record set 302 that includes the First_Name feature. In record set 302, only some of which is shown, "Rachel" has nine occurrences as in the First_Name record feature, and therefore exceeds the threshold count criterion of two.

The remaining 1-tuple records include Chris with five occurrences, Eli with three occurrences and Mohammed and Jeff each having only one occurrence. Because Chris and Eli also exceed the threshold count criterion of two, while Mohammed, and Jeff each have only one occurrence. When the First_Name feature is combined with an m-tuple to produce an expanded n-tuple, unique values of Mohammed and Jeff are not be used to generate n-tuples. This qualification can applied during generation of an n-tuple, processing only the 1-tuples in list 304, which includes Rachel (9), Chris (5), and Eli (3).

In practice, the threshold count criterion can be in a range of 2 to 20. Alternatively, a range of 4 to 14 or a narrower range such as 5 to 9 can be used. Special cases exist in which the threshold could be 0 or 1, as discussed above. A threshold count criterion of 20 is large enough for most purposes. For a very large data set, a threshold count criterion in a range of 20 to 100 could be used.

Figure 3B:
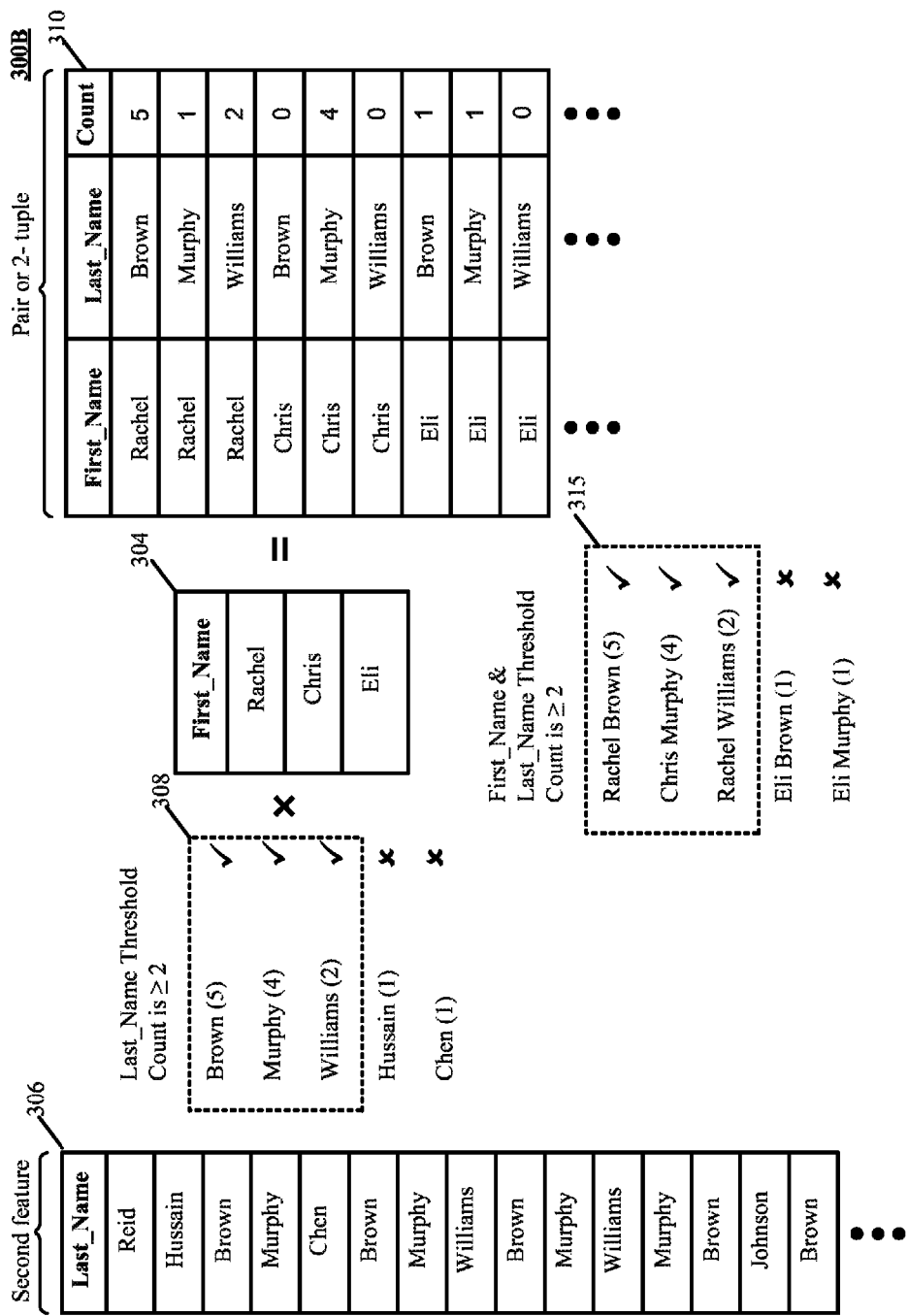
FIG. 3B illustrates thresholding a double or 2-tuple data set.

FIG. 3B illustrates thresholding a double or 2-tuple data set. In the record set 306 a Last_Name threshold count criterion of two is applied to unique values of Last_Name. In the 1-tuple list of Last_Name values 306, Brown has five occurrences, Murphy has four occurrences, and Williams has two occurrences, all satisfying the threshold count criterion of two. Hussain and Chen each have only one occurrence in data set 306 and are therefore pruned from the list. The thresholded list 308 includes Brown (5), Murphy (4), and Williams (2) as unique values of last names that satisfy the threshold count criterion.

Next, the values in the First_Name list 304 that satisfy the threshold are combined with the pruned Last_Name 308 to produce a combined 2-tuple list 310 of First_Name and Last_Name. A threshold count criterion of two (which is the same as, but could be different than the threshold for 1-tuples) is applied to potential 2-tuples 310 to produce a list of inhabited 2-tuples 315. This list includes Rachel Brown (5), Chris Murphy (4), and Rachel Williams (2) since each (First_Name, Last_Name) pair satisfies the threshold count criterion of two. Because Eli Brown and Eli Murphy each only occurred once in the 2-tuple extract of record set 310, they are pruned from the list.

The threshold count criterion can be applied to a count of items in the record set or to a combined count of items in the record set and a reference data set. Analysis of record sets that are already subsets of the reference data set, for instance, could apply the threshold count criteria to just elements in the record set. Indexing elements as they are added to a reference data set could apply the threshold count criteria to the combined population of the record set and reference data set. In some circumstances, thresholding could be applied to counts against more than data set.

This combinatorial generation of tuples can be adapted to large distributed processing systems such as ones running Hadoop. Optimizations are available to process record sets using a Map-Reduce or Map-Combine-Reduce approach, either adding record sets to an existing corpus or analyzing record sets against a corpus without adding them. Map can be used emit processing instructions for potential tuples and reduce to process them accordingly.

One optimization is to maintain indexes of n-tuples generated over a particular interval (or for the whole corpus) to reduce the processing time required to identify n-tuples for which the threshold count criterion has been satisfied. If the index was built to enumerate all tuples (threshold=1), the index can be annotated to indicate how many tuples are chained to the index bucket, as described below.

Another optimization is to maintain a process accounting data structure that keeps track of candidate n-tuples that have been considered but have not satisfied the threshold count criterion. For instance, when a candidate n-tuple is not found in an index or histogram, a combined population of indexed and input tuples can be calculated and the fact of the calculation stored to reduce subsequent calculation needs. When an n-tuple is not found (say n is even; handling of an odd n produces an uneven split), at least one and probably both of first and second half n/2-tuples produced by splitting the n-tuple in half can be found in the index. (If one of the n/2 tuples is not found in the index, it can be recursively split until all of the parts are found in the index.) Splitting lists can take advantage of canonical ordering of features in a tuple. Since the number of elements in an n/2-tuple is strictly less than or equal to the number of elements in the shortest 1-tuple used to build the n/2-tuple, intersecting element lists from the first and second half n/2-tuple indexes requires less computation than intersecting element lists from 1-tuples.

When a pair of first and second half n/2-tuples are intersected, a process accounting data structure can record the n-tuple processed, the number of inhabitants found in the intersection, and sizes of element lists for the first and second half n/2-tuples at the time of analysis. If the number of inhabitants found, including any records being added, is just one less than the threshold, the next new record added can cause a process to emit a data item that calls for the corresponding n-tuple to be added to an index. The next new record added also can cause a process to emit a data item that calls for other further processing, such as outlier analysis. In addition, when the analyzed n-tuple is revisited, the first and second half n/2-tuples can be retrieved from the index and the sizes of their element lists can be compared to the process accounting data structure to determine whether to recalculate the intersection of the element lists. While an unchanged length of element lists does not guarantee that intersection of the element lists would produce the same number of inhabitants, chances may be good enough to not repeat the relatively expensive intersection operation.

Flowcharts for Identifying Outliers

Figure 4:
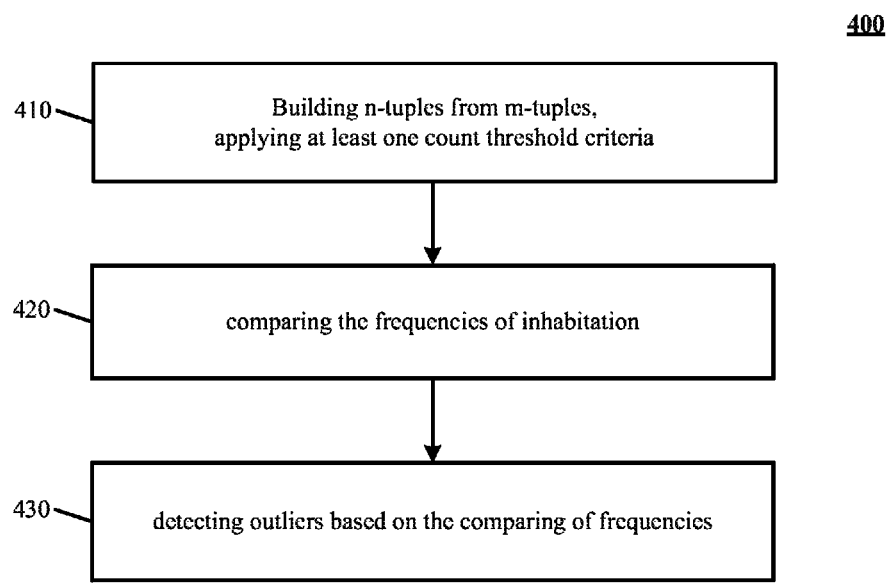
FIG. 4 illustrates a flowchart shows one implementation of identifying anomalous data in large data sets.

FIG. 4 illustrates a flowchart of one implementation 400 of identifying anomalous data in large data sets. Other implementations may perform the steps in different orders and/or with different, fewer or additional steps than the ones illustrated in FIG. 4. The actions described below can be subdivided into more steps or combined into fewer steps to carry out the method described using a different number or arrangement of steps.

At action 410, n-tuples are built by adding just one more feature to an n-tuple. Thresholding is applied to control combinatorial growth in the number of potential n-tuples that combine unique features of constituent 1-tuples.

At action 420, a comparison occurs between the frequency of unique elements in the expanded tuple set and a reference frequency of unique elements. The reference data set can include the record data set being analyzed. This is appropriate when the reference data set is much larger than the record set that it contains, such as a reference data set at least 10 or 100 or 1000 times as large as the reference data set. As a practical matter, the reference data set is expected to be no more than one billion times as large as the record data set being analyzed.

In terms of probabilities, this analysis can probe for P(subset of features|some other feature)>P(subset of features), in which the probability of a subset of features appearing given some other feature, such as contributor, is greater than the probability of the subset of features in general. For instance, does the name "bob" appear in one source's contributions of contacts much more often in contacts than it does in the general population?

At action 430, outliers become apparent based on the comparison between the two frequencies. The outliers can be identified for further analysis or tallied to summarize outlier characteristics of the record set analyzed.

Figure 5:
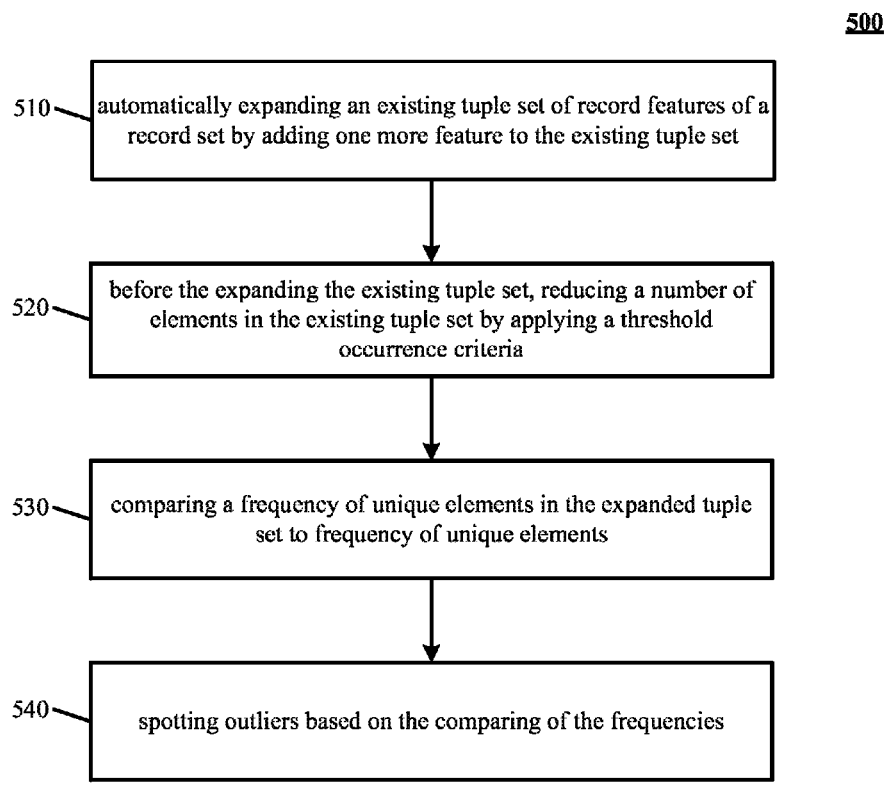
FIG. 5 illustrates a flowchart of another implementation of identifying anomalous data in large data sets by applying a threshold criterion.

FIG. 5 illustrates a flowchart 500 of another implementation of identifying anomalous data in large data sets by applying a threshold criterion. At action 510 a record in an existing tuple set is automatically expanded by adding another feature to the existing tuple set, producing an expanded tuple set. Adding one more feature to a tuple lengthens the tuple. This action can be repeated to expand 1-tuples to longer tuples, such as 2 to 20 tuples or 4 to 9 tuples. From experience, it appears that many kinds of analysis can be performed on combinations of 4 to 9 features in a tuple.

At action 520, before the new feature combined with the existing tuple set, the number of unique elements in the existing tuple set is reduced after applying a threshold count criterion. The new feature combined with the existing tuple set produces an expanded tuple set with one more feature.

Next, at action 530, a comparison occurs between the frequency of unique elements in the expanded tuple set and a frequency of unique elements in a reference data set. As above, the reference data set can be stratified or unstratified. The reference data set can include the record data set being analyzed.

At action 540, outliers or uninhabited data become apparent based on the comparison between the two frequencies. The outliers can be identified for further analysis or tallied to summarize outlier characteristics of the record set analyzed. Examples of applying outlier analysis to various problems are described in the following section.

Example Applications of Detecting Outliers

In one implementation, a method is applied to identifying anomalous insurance claims submitted by a healthcare provider for reimbursement, such as Medicare reimbursement. This method can utilize either of the tuple generation methods describe above. In this setting, the record set and reference data set both include insurance claims submitted from service providers. The record set includes records from at least one identified service provider whose claims are being tested. The method compares insurance claim feature tuples generated from the record set for an identified service provider with insurance claim feature tuples from the reference data set. The reference data set can be selected to focus on a particular data source, such as insurance claims submitted by nursing homes. The outliers can be identified sources whose insurance claims have been submitted with an anomalous frequency or it can be specific claims from the identified sources. The resulting data can be used to trigger investigations or to support rules or regulations on reimbursement.

In another implementation, a method is applied to identifying valued sources of contacts. In practice, sources contribute lists of contacts to a shared, often commercial repository. Some sources consistently deliver more commercial value than other sources. In this setting, the record set and the reference data set both include sales of contact records. The record set includes records from one or more identified sources that are being tested for frequency of contact resale. Typically, multiple sources are evaluated in a single run. Source identifiers can be and commercial value of contacts sold associated with the record set for analysis. The method compares frequencies or values of the sales of contact records having record features that match the tuples generated from the record set to the tuples generated from the reference data set. The outliers are identified sources whose contact records have been resold with an anomalous frequency or subsets or records from identified sources that are resold with an anomalous frequency. The resulting data can be used to cultivate sources and to structure campaigns or rewards for obtaining more contact records.

In another implementation, a method is applied to identifying types of customer complaints that are resolved by call centers or customer service agents particularly effectively (or ineffectively.) This method can utilize either of the tuple generation methods describe above. In this setting, record set and reference data set both include completed call statistics from incoming customer service calls. The calls may have been successfully or unsuccessfully resolved. The record set includes records from at least one identified call center or customer service representative whose incoming customer calls are being evaluated. The reference data set can be stratified, such as to reference quickly, effectively or badly resolved calls. The method compares the frequencies of customer service call feature tuples generated from the record set with feature tuples from the reference data set. The outliers are identified as call centers or service representatives who resolved customer service calls with an anomalous frequency. The resulting data can be used to select routing of an incoming call based on features of the service request.

Indexing Tuples

The technology disclosed further relates to indexing and searching high dimensional tuple spaces in a computer-implemented system, as illustrated in the high level block diagram of FIG. 7. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. In this application, computer readable storage medium and storage system refer to tangible storage media such as magnetic and optical rotating storage media, non-volatile SSD drives and volatile DRAM, and explicitly exclude transitory wave forms, such as radio waves or digital transmissions on a wire. There are implementations of the technology disclosed that can be implemented as downloading code via a transitory wave form, but use of the terms "computer readable storage medium" and "storage system" does not encompass to transitory wave forms.

Using the technology disclosed, users can find items that show up an exceptional number of times in the database 718, identify those users who have contributed a large number of those, and further identify the files in which those contributions occurred. For example, the title "CEO" can show up 1000 times among a bunch of files. User X can be responsible for 500 of these, which can be further spread across files A and B. In addition, user Y can be responsible for the rest in files C and D.

The users are aware of or can find out the types of various features or items. In a first search use case, users know that they are looking for values of the type "title," such as "CEO." In the second search example, users know the type to be "user", and in the third users are aware of the types "title", "user", and "filename." For discussion, we keep in mind the difference between tuple item types and tuple item values.

The technology disclosed can utilize a canonical order for the data item types. In some implementations, a user can search using the features "type", "user", "filename" and "title" to provide a tuple with a set of properties that have a canonical name. The full name of a tuple can be the type followed by the values in the same order. For example, "title||CEO", "user|title||X|CEO", "user|title||Y|CEO", and "user|filename|title||X|A|CEO", "user|filename|title|X|B|CEO", etc. Other values associated with a tuple, such as membership can appear in a separate data structure.

For each type, the technology disclosed can be implemented using an array of hash tables of the same arity as the types. For example, for "user|title", the array can have two hash tables: the first for "user" and the second for "title." For "user|filename|title", the system can have three hash tables 712. The keys for each hash table can be the values that appear for that type in the corresponding 1-tuple. The value for each hash table entry can be a sorted list of tuples of that type containing the key value in the appropriate column. In some implementations, inhabited 2-tuples, 3-tuples or n-tuples also could be indexed in hash tables.

Consider, for instance, a database of tuple type "user|filename|title". The technology disclosed can be implemented by an array of indexes. The first can be for type "users", the second for "filenames" and the third for "titles." Multiple data tables can store records that include these 3-tuples. The first data table can have the following entries:

X:["user|filename|title||X|A|CEO","user|filename|title||X|B|CEO"] and

Y:["user|filename|title||Y|C|CEO","user|filename|title||Y|D|CEO"].

The second data table can have the following keys:

A:["user|filename|title||X|A|CEO"], B:["user|filename|title||X|B|CEO"],

C:["user|filename|title||Y|C|CEO"],D:["user|filename|title||Y|D|CEO"].

The third data table can have following entries:

CEO:["user|filename|title||X|A|CEO","user|filename|title||X|B|CEO","user|filename|title||Y|C|CEO","user|filename|title||Y|D|CEO"].

The technology disclosed uses an index query and intersection engine 722 to intersect result lists for various sorts of queries. In some implementations, the hash table can store the number of entries connected to a hash bucket or to a value hashed into the hash bucket. This would allow the hash table to return tuples of the appropriate type and frequency without needing to follow chains of entries associated with a hash bucket. The number of entries can be updated each time the chain of entries is updated.

Apply the frequent title query to the tuple type "user|filename|title", seeking users who have most frequently contributed the frequently used titles. We sort references in the title frequency criterion results and intersect references in that sorted list with references of user contributions to find users who contributed CEO contacts. There are alternative strategies for sorting and intersecting or filtering. In one implementation, the chain of references from a hash bucket is sorted. A top frequency result consisting of the title "CEO" would be already be a sorted list of references that could be compared to chains of references for the various users. Alternatively, user references to tuples could be sorted by reference and then intersected with the frequency criterion results.

After applying the frequency criterion to "title|user" tuples, we retrieve "user|filename|title" tuples that remain after intersection of the lists to return the desired output. If we had retrieved tuples after looking at just the user hash table or just the title hash table, many tuple entries would have needed to be retrieved, because the hash tables do not store the contents of the tuples, just a references to the tuples. Since the lists are sorted, we intersected the user and title references lists and accessed just the tuples with the appropriate filenames.

Index entries for m-tuples also can be generated using this technology, as described above. These multi-feature indexes can be used for retrieval or just for processing.

Computer System

FIG. 6 is a block diagram of an example computer system 600 for feed customization and streamlining. FIG. 6 is a block diagram of an example computer system, according to one implementation. Computer system 610 typically includes at least one processor 614 that communicates with a number of peripheral devices via bus subsystem 612. These peripheral devices can include a storage subsystem 624 including, for example, memory devices and a file storage subsystem, user interface input devices 622, user interface output devices 620, and a network interface subsystem 617. The input and output devices allow user interaction with computer system 610. Network interface subsystem 617 provides an interface to outside networks, including an interface to corresponding interface devices in other computer systems.

User interface input devices 622 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 610.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules and methods described herein. These software modules are generally executed by processor 614 alone or in combination with other processors.

A file storage subsystem 628 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative implementations of the bus subsystem can use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In two implementation, a system and method implemented using a system are described that can be applied to identifying anomalous data in large structured data sets. The system is based on a computer including memory. The memory is loaded with instructions causing the computer to implement automatically expanding an existing tuple set of elements with features from a record set by adding one more feature to the existing tuple set and creating unique elements with the one more feature, wherein the unique elements in an expanded tuple set enumerate permutations of unique values of the features from the record set that are combined in the expanded tuple set. The system further implements limiting unique elements in the expanded tuple set to inhabited feature value combinations by applying a threshold count criterion of 2 or more to counts of how often the feature value combinations of the unique elements are found in the record set and not retaining unique elements in the expanded tuple set that do not satisfy the threshold count criterion. After expanding the existing tuple set into the expanded tuple set and applying the threshold count criterion, the system implements comparing frequencies of the unique elements in the expanded tuple set to frequencies of the unique elements in a reference data set and spotting outliers based on the comparing of the frequencies. These outliers can be persisted to memory or forwarded to another application for further analysis.

For clarity, in this description of particular implementations, the record set is the data set being analyzed. The reference data set is what the record set is compared to. A tuple is a structure that includes features, between one and the number of features in the record set. Typically, the record set and reference data set have the same number of features. An element is an instance of a tuple in which the features have values. Unique elements have a unique combination of feature values. Enumerating permutations of unique values creates combinations of unique values from individual features, regardless of whether those combinations actually are found in the record set or the reference data set. Unique elements are inhabited when there is at least one object in the record set that has the combination of feature values in the unique element. A unique element is uninhabited if the combination of feature values is possible but not actually found in any object in the record set. Counts of unique elements indicate how often the unique combinations of values occur in the record set or in a reference data set. The existing tuple set has m features and expanded tuple set has one more or m+1=n features.

This system and other implementations of the technology disclosed can include one or more of the following features and/or features described in connection with additional systems and methods disclosed. In the interest of conciseness, the combinations of features disclosed in this application are not individually enumerated and are not repeated with each base set of features. The reader will understand how features identified in this section can readily be combined with sets of base features identified.

The threshold count criterion can be in a range of 2 to 20. It can be in a narrower range such as 4 to 14 or in a narrower range of 5 to 9. Other thresholds can be used as described above.

The number of record features in the expanded tuple set can be in a range of 2 to 100 features. It could be in a narrower range of 4 to 40 features or 5 to 20 features. More advantage can be realized when more features and potential but uninhabited tuples are involved.

In some implementations, the record set includes records of a first type that are being tested for frequency of anomalies; and the reference data set includes between 10 times and 100 billion times as many records of the first type as the record set.

The spotting of outliers can be applied repeatedly to distinct groups of records the first type. Broadly speaking, there can be between 10 and 100 million distinct groups of the first type, or even more.

Other implementations may include a non-transitory computer readable storage medium storing instructions executable by a processor to perform any of the methods described above. Yet other implementations may include methods implemented by a computer system, carrying out the steps that the system is capable of implementing.

A number of applications of this technology can readily be identified. One involves identifying sources of frequently sold contacts. This application can identify valued sources of contacts. In this implementation, the record set and the reference data set both include sales of contact records. The record set includes records from identified sources that are being tested for frequency of contact resale. The record set and the reference data set both have frequencies or counts of contact record sales. Applying the method above, the comparing the frequencies includes comparing the frequencies of the contact record sales for the tuples generated from the record set to the tuples generated from the reference data set. As a natural result, the outliers are the identified sources whose contact records have been sold with an anomalous frequency.

One feature of this application is that categories of the identified valued sources of the contacts can include company name, contact title, contact location.

Another application of this method involves screening insurance claims. In this application, the record set and the reference data set both include insurance claims submitted from service providers. The record set includes records from at least one identified service provider whose claims are being tested. Comparing the frequencies includes comparing frequencies of insurance claim feature tuples generated from the record set for an identified service provider to insurance claim feature the tuples from the reference data set.

As one aspect of screening insurance claims, the submissions of insurance claims have record features that match the tuples generated from the record set to the tuples generated from the reference data set. The outliers are identified sources whose insurance claims have been submitted with an anomalous frequency.

Another application of this method involves customer service call center routing. In one application of this technology to call centers, the record set and the reference data set both include completed call summaries submitted from incoming customer calls. The record set includes records from at least one identified call center whose incoming customer calls are being evaluated. The comparing the frequencies includes comparing frequencies of customer complaint feature tuples generated from the record set for an identified call center to customer complaint feature tuples from the reference data set.

As one aspect of call center implementations, submissions of incoming customer calls having record features that match the tuples generated from the record set to the tuples generated from the reference data set. The outliers are customer service agents whose completed call summaries have been resolved with an anomalous frequency.

As another aspect, wherein the completed call summaries with anomalous frequency correlate to customer service agents who handled the incoming service calls with high rates of success.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Another aspect of the technology disclosed is hash table indexing of record features to facilitate retrieval both by hash key and frequency queries. One implementation describes a system and method implemented using a computer system that handles tuple frequency queries. The system is based on a computer including memory. The memory is loaded with instructions causing the computer to implement, for a database of feature tuples persisted on a memory system, building hash table indexes on a plurality of individual features of the database and receiving a frequency query that specifies at least one frequency criterion to be applied to a particular feature of the database. For the frequency criterion, the system implements dumping and iterating through a corresponding hash table index for the particular feature to identify unique feature values that satisfy the frequency criterion. For a frequency query that further specifies hash key search criterion applicable to additional features, the system implements intersecting results of hashing the hash key search criterion with the results that satisfy the frequency criterion. A result implemented by the system is returning a response to the frequency query based on the intersecting the results.

As indicated above, this system and other implementations of the technology disclosed can include one or more of the features described in connection with additional systems and methods disclosed. For the sake of brevity, they are not repeated here, but incorporated by reference. Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

A computer readable media implementation of the first method in this section includes instructions that, when executed on a processor, cause the processor to automatically expand an existing tuple set of record features of a record set by adding one more feature to the existing tuple set, wherein tuples in an expanded tuple set enumerate at least some inhabited permutations of values of the record features that are combined in elements of the expanded tuple set. The instructions further cause the processor, before the expanding the existing tuple set, to reduce a number of elements in the existing tuple set by applying a threshold count criterion to counts of unique elements in the existing tuple set and eliminating from the expanding those unique entries that do not satisfy the threshold count criterion. After expanding the existing tuple set into the expanded tuple set, compare frequencies of unique elements in the expanded tuple set to frequencies of the unique elements in a reference data set. The instructions cause the processor to spot outliers based on the comparing of the frequencies.

As indicated above, many of the features of other methods can be combined with this method. For the sake of brevity, they are not repeated here, but incorporated by reference.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A system that identifies anomalous data in a record set by comparing frequencies of unique elements obtained from the record set and frequencies of the unique elements in a reference data set, the system including:
   a computer including memory; and
   computer instructions causing the computer to implement:
      creating an expanded tuple set by automatically expanding an existing first tuple set of a first feature from the record set to include a second tuple set of a second feature from the record set, the existing first tuple set being expanded by (i) adding the second tuple set to the existing first tuple set and (ii) creating unique elements with elements from the first feature from the record set and the second feature from the record set, wherein the unique elements in the expanded tuple set enumerate permutations of unique values of the second feature from the record set that are combined with values of the first feature from the record set to form the expanded tuple set;
      identifying a count of how often each feature value combination of the unique elements is found in the expanded tuple set;
      limiting the unique elements in the expanded tuple set to inhabited feature value combinations by (i) applying a threshold count criterion of 2 or more to the identified counts of how often the feature value combinations of the unique elements are found in the expanded tuple set and (ii) not retaining unique elements in the expanded tuple set that do not satisfy the threshold count criterion;
      after expanding the existing first tuple set into the expanded tuple set and applying the threshold count criterion, comparing frequencies of the unique elements in the expanded tuple set to frequencies of the unique elements in the reference data set to identify anomalous frequencies of the unique elements in the expanded tuple set with respect to the frequencies of the unique elements in the reference data set; and
      spotting outliers from the expanded tuple set with respect to the reference data set based on the identified anomalous frequencies.

2. The system of claim 1, wherein the threshold count criterion is in a range of 2 to 20.

3. The system of claim 1, wherein a number of features in the expanded tuple set is in a range of 4 to 40.

4. The system of claim 1, wherein a number of features in the expanded tuple set is in a range of 5 to 20.

5. The system of claim 1, further including, before combining a unique value of the second feature from the record set with an element of or applying the threshold count criterion to a resulting expanded tuple set element, qualifying the unique value of the second feature as satisfying the threshold count criterion.

6. The system of claim 1, wherein:
   the record set includes elements of a first type that are being tested for frequency of anomalies; and
   the reference data set includes between 10 and one billion times as many elements of the first type as the record set.

7. The system of claim 6, applied repeatedly to distinct groups of elements the first type, wherein there are between 10 and one million of the distinct groups of the first type.

8. The system of claim 1, wherein the computer instructions further cause the computer to implement reporting the outliers for analysis.

9. The system of claim 1, applied to identifying valued sources of contacts, wherein:
   the record set and the reference data set both include sales of contact objects;
   the record set includes contact objects from identified sources that are being tested for frequency of contact resale;
   the record set and the reference data set both include or can be counted to produce a frequencies contact object sales;
   the comparing of the frequencies includes comparing the frequencies of the contact object sales for the expanded tuple set generated from the record set to tuples generated from the reference data set; and
   the outliers are the identified sources whose contact objects have been sold with an anomalous frequency.

10. The system of claim 9, wherein categories of the identified valued sources of contacts further comprise company name, contact title, and contact location.

11. The system of claim 1, applied to screening insurance claims, wherein:
    the record set and the reference data set both include insurance claims submitted from service providers;
    the record set includes objects from at least one identified service provider whose claims are being tested; and
    the comparing of the frequencies includes comparing frequencies of insurance claim feature tuples generated from the record set for an identified service provider to insurance claim feature tuples generated from the reference data set.

12. The system of claim 11, further including:
    submissions of insurance claims having object features that match the insurance claim feature tuples generated from the record set to the insurance claim feature tuples generated from the reference data set; and
    the outliers are identified sources whose insurance claims have been submitted with an anomalous frequency.

13. The system of claim 1, applied to customer service call center routing wherein:
    the record set and the reference data set both include completed call summaries submitted from incoming customer calls;
    the record set includes objects from at least one identified call center whose incoming customer calls are being evaluated; and
    the comparing of the frequencies includes comparing frequencies of customer complaint feature tuples generated from the record set for an identified call center to customer complaint feature tuples from the reference data set.

14. The system of claim 13, further including:
completed call summaries having object features that match the expanded tuple set generated from the record set to the tuples generated from the reference data set; and
the outliers are customer service agents whose completed call summaries have been resolved with an anomalous frequency.

15. The system of claim 14, wherein resolved customer complaints with anomalous frequency correlate to customer service agents who handled incoming service calls with high rates of success.

16. A non-transitory computer readable media, including instructions that, when executed on a processor, cause the processor to execute a method for identifying anomalous data in a record set by comparing frequencies of unique elements obtained from the record set and frequencies of the unique elements in a reference data set, the method comprising:
creating an expanded tuple set by automatically expanding an existing first tuple set of a first feature from the record set to include a second tuple set of a second feature from the record set, the existing first tuple set being expanded by (i) adding the second tuple set to the existing first tuple set, and (ii) creating unique elements with elements from the first feature from the record set and the second feature from the record set, wherein the unique elements in the expanded tuple set enumerate permutations of unique values of the second feature from the record set that are combined with values of the first feature from the record set to form the expanded tuple set;
identifying a count of how often each feature value combination of the unique elements is found in the expanded tuple set;
limiting the unique elements in the expanded tuple set to inhabited feature value combinations by (i) applying a threshold count criterion of 2 or more to the identified counts of how often the feature value combinations of the unique elements are found in the expanded tuple set and (ii) not retaining unique elements in the expanded tuple set that do not satisfy the threshold count criterion;
after expanding the existing first tuple set into the expanded tuple set and applying the threshold count criterion, comparing frequencies of the unique elements in the expanded tuple set to frequencies of the unique elements in the reference data set to identify anomalous frequencies of the unique elements in the expanded tuple set with respect to the frequencies of the unique elements in the reference data set; and
spotting outliers from the expanded tuple set with respect to the reference data set based on the identified anomalous frequencies.

17. A method of identifying anomalous data in a record set by comparing frequencies of unique elements obtained from the record set and frequencies of the unique elements in a reference data set, the method including:
creating an expanded tuple set by automatically expanding an existing first tuple set of a first feature from the record set to include a second tuple set of a second feature from the record set, the existing first tuple set being expanded by (i) adding the second tuple set to the existing first tuple set and (ii) creating unique elements with elements from the first feature from the record set and the second feature from the record set, wherein the unique elements in the expanded tuple set enumerate permutations of unique values of the second feature from the record set that are combined with values of the first feature from the record set to form the expanded tuple set;
identifying a count of how often each feature value combination of the unique elements is found in the expanded tuple set;
limiting the unique elements in the expanded tuple set to inhabited feature value combinations by (i) applying a threshold count criterion of 2 or more to the identified counts of how often the feature value combinations of the unique elements are found in the expanded tuple set and (ii) not retaining unique elements in the expanded tuple set that do not satisfy the threshold count criterion;
after expanding the existing first tuple set into the expanded tuple set and applying the threshold count criterion, comparing frequencies of the unique elements in the expanded tuple set to frequencies of the unique elements in the reference data set to identify anomalous frequencies of the unique elements in the expanded tuple set with respect to the frequencies of the unique elements in the reference data set; and
spotting outliers from the expanded tuple set with respect to the reference data set based on the identified anomalous frequencies.

18. The method of claim 17, wherein the threshold count criterion is in a range of 2 to 20.

19. The method of claim 18, wherein a number of features in the expanded tuple set is in a range of 4 to 40.

* * * * *